Feb. 28, 1950   R. M. BUCKLEY   2,499,016
POT STRAINER
Filed May 6, 1946
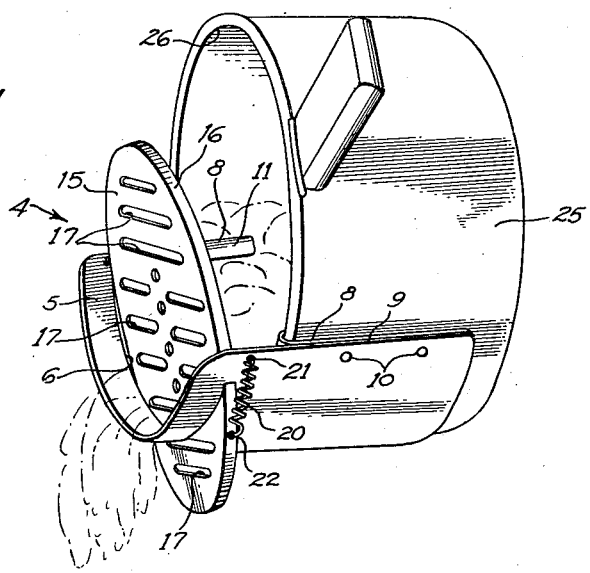
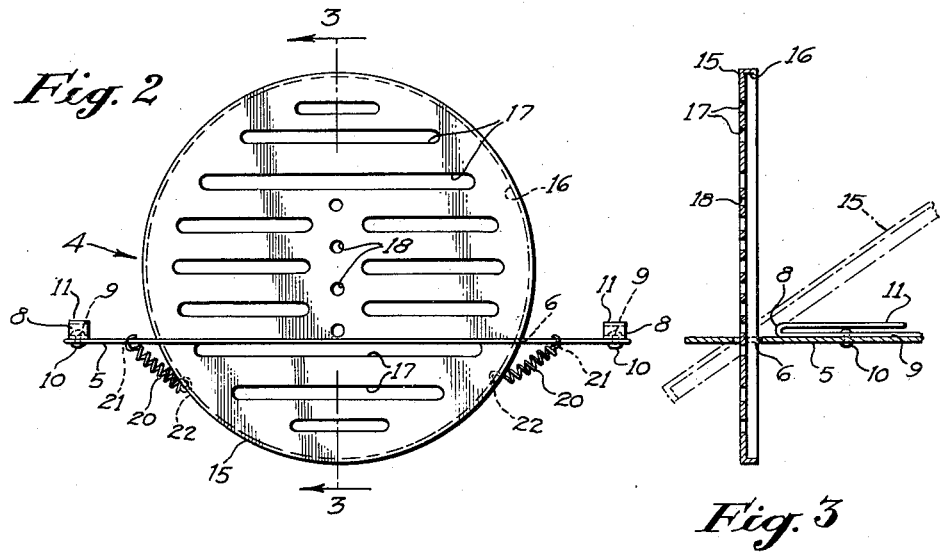
INVENTOR:
ROBERT M. BUCKLEY,
By HARRIS, KIECH, FOSTER & HARRIS,
FOR THE FIRM
ATTORNEYS Patented Feb. 28, 1950

2,499,016

UNITED STATES PATENT OFFICE 2,499,016

POT STRAINER

Robert M. Buckley, Pasadena, Calif.

Application May 6, 1946, Serial No. 667,532

6 Claims. (Cl. 210—163.5)

This invention relates to straining devices and particularly to a device especially adapted for use in straining foods cooked in various types of cooking vessels.

Various devices are used for straining vegetables, fruit and other foods cooked in pots and other vessels and these devices usually consist of sieves, colanders or like utensils which are held in one hand as the food is poured thereinto from the pot held in the other hand. Steam rising from the boiling water in which the food is cooked presents a serious hazard, often burning the hand of the user. To offset this condition various straining devices, such as colanders, have been used but in this case the food poured into such utensils is apt to spill over. It is an object of my invention to overcome these difficulties by providing a straining device which is adapted to be attached to a vessel when it is desired to drain the water therefrom and to be readily removable from the vessel after use.

Another object is to provide a strainer device which is readily adjustable to enable it to be used with pots or pans of a large variety of sizes and shapes.

Another object is to provide a device of the character referred to which has means for firmly clamping it to a pot or other cooking vessel so that manual supporting of the device is unnecessary and thus the danger of burning the hands is entirely avoided.

Another object is to provide a device of the type indicated which is especially simple in construction, being composed of a minimum number of parts adapted to be stamped from sheet metal and readily assembled, and one which may be easily cleaned.

Another object is to provide a strainer device which is adapted to be folded into a small compact form capable of being readily stored in a drawer.

Further objects of my invention will appear from the following specification and the drawing, which is intended for the purpose of illustration only, and in which:

Fig. 1 is a perspective view of a cooking pot or vessel, showing my improved straining device as applied to use therewith;

Fig. 2 is a front elevational view of the strainer device showing the relation of its parts before or following application to the cooking vessel; and Fig. 3 is a cross-sectional view taken on line 3—3 of Fig. 2.

My improved strainer device 4 comprises, essentially, a substantially rectangular plate member 5 constructed from flexible material, preferably sheet metal, and provided adjacent the edge of one of its longer sides with an elongated opening or slot 6. Adjacent its short sides or ends, the plate member 5 is provided with U-shaped clips or retaining members 8 having one leg 9 secured to the member 5 by rivets 10 and another leg 11 adapted to resiliently grip the interior of a pot or pan in the manner to be explained hereinafter.

An interstitial disc member 15 is disposed within the elongated slot 6 and in a plane substantially at right angles to the plane of the plate member 5 when the latter is in unflexed condition as shown in Figs. 2 and 3. The disc member 15 has a peripheral flange 16 designed to strengthen the structure and the over-all width of the disc is made slightly less than the width of the elongated opening 6. The disc member 15 may be perforated, slitted, provided with a wire mesh portion or otherwise formed with interstices through which liquid may pass, the present drawing illustrating the disc member as provided with transverse openings 17 and holes 18 for this purpose. As shown in Fig. 2, the disc member 15 is slightly larger in diameter than the length of the elongated opening 6 so that it is supported by the plate member 5.

Means are provided for retaining the disc member 15 in place in the opening 6 and I prefer to employ a pair of spring members 20 for this purpose. Each coil spring 20 has one end hooked through a hole 21 in the plate member 5 and its other end inserted through a hole 22 in the disc member 15.

The strainer device is applied to use in the manner next explained. After vegetables or other solid foods have been cooked in a pot or other vessel, such as that shown at 25 in Fig. 1, and it is desired to separate the cooking water or the juices from the solids, the cover of the pot is first removed and the strainer device 4 is applied to the pot. To apply the strainer device 4 to the cooking vessel 25, the plate member 5 is flexed to cause it to assume the curvature of the peripheral wall of the vessel and thereafter the plate member is slid down with the resilient legs 11 of the retaining members 8 entering the pot to frictionally engage the interior of the cylindrical wall of the vessel to hold the device in place on the vessel. When the strainer device 4 is thus attached to the vessel 25 its disc member 15 will be disposed across the mouth 26 of the vessel and when the vessel is tilted as shown in Fig. 1, the liquid content of the vessel will drain out through the openings 17 and holes 18, and the solids will be retained within the vessel. Since the strainer device is securely attached to the vessel it is unnecessary to manually support the device and thus the danger of burning the hand is avoided. After the liquid content of the food has been drained from the vessel 25, the vessel is placed in erect position and the strainer device 4 removed by merely lifting it therefrom.

It is to be particularly noted that the plate member 5 may be flexed in accordance with the curvature of the pot with which it is to be used so that it may be applied to a relatively large variety of vessels commonly used for cooking foods. Because the diameter of the disc member 15 is slightly greater than the length of the elongated opening 6, its peripheral flange 16 will rest against the ends of the opening, regardless of the curvature of the plate member 5 and thus be supported in position to extend across the opening or mouth of the vessel. The spring members 20 serve to retain the disc member 15 within the slot 6 so that disconnection of the main parts of the device is prevented. After the device has served its purpose it may be readily cleaned, it being understood that the parts of the device may be made from stainless steel or other non-corrosive material. The plate member 5 and disc member 15 may be relatively folded, as indicated by the dotted lines in Fig. 3, whereby to reduce the size of the device and adapt it to be conveniently stored in a drawer or other receptacle.

It will be observed from the foregoing that my invention provides a particularly simple, yet efficient device for straining various foods and one which may be readily adjusted to conform to the size and shape of a large variety of vessels. Because the device is secured to the vessel from which liquid is to be drained it is unnecessary to hold the device in the hand and thus the danger of burning the hand, when hot liquid is being poured, is avoided.

While the improved strainer device has been herein shown and described as embodied in a preferred form of construction, by way of example, it is to be understood that various changes may be made in its construction and in the manner of applying it to use without departing from the spirit of the invention and I therefore reserve the right to all such changes as properly come within the scope of the appended claims.

I claim as my invention:

1. A device for straining liquid poured from the openings of vessels of various diameters, comprising: a flexible holder member adapted to be flexed to partially encircle vessels of various diameters, said holder member being provided with an elongated opening; resilient clip members on said holder member adapted to frictionally grip the cylindrical wall of any one of said vessels to retain said holder member in place on said vessel; and a disc member disposed in said elongated opening and having interstices, said disc member extending across the opening of said vessel to retain solids within said vessel while permitting discharge of liquid from said vessel through said interstices.

2. A device for straining liquid poured from the openings of vessels of various diameters, comprising: a flexible holder member adapted to be flexed to partially encircle vessels of various diameters, said holder member being provided with an elongated opening; resilient clip members on said holder member adapted to frictionally grip the cylindrical wall of any one of said vessels to retain said holder member in place on said vessel; and a disc member disposed in said elongated opening and provided with elongated slots, said disc member extending across the opening of said vessel to retain solids within said vessel while permitting discharge of liquid from said vessel through said slots.

3. A device for straining liquid poured from the openings of vessels of various diameters, comprising: a flexible holder member adapted to be flexed to partially encircle vessels of various diameters, said holder member being provided with an elongated opening; resilient clip members carried by said holder member and adapted to overlie the rim of the opening of any one of said vessels and to frictionally grip the cylindrical wall thereof to retain said holder member in place on said vessel; a disc member disposed in said elongated opening and provided with elongated slots, said disc member extending across the opening of said vessel to retain solids within said vessel while permitting discharge of liquid from said vessel through said slots; and retaining means for retaining said disc member in said elongated opening.

4. A device for straining liquid poured from the openings of vessels of various diameters, comprising: a flexible holder member adapted to be flexed to partially encircle vessels of various diameters, said holder member being provided with an elongated opening; resilient clip members carried by said holder member and adapted to overlie the rim of the opening of any one of said vessels and to frictionally grip the cylindrical wall thereof to retain said holder member in place on said vessel; a flanged disc member disposed in said elongated opening and provided with elongated slots, said disc member extending across the opening of said vessel to retain solids within said vessel while permitting discharge of liquid from said vessel through said slots; and resilient retaining means for retaining said disc member in said elongated opening.

5. A device for straining liquid poured from the openings of vessels of various diameters, comprising: a flexible holder member adapted to be flexed to partially encircle vessels of various diameters, said holder member being provided with an elongated opening; resilient clip members carried by said holder member and adapted to overlie the rim of the opening of any one of said vessels and to frictionally grip the cylindrical wall thereof to retain said holder member in place on said vessel; a flanged disc member disposed in said elongated opening and provided with elongated slots, said disc member extending across the opening of said vessel to retain solids within said vessel while permitting discharge of liquid from said vessel through said slots; and spring members connected between said holder member and said disc member for retaining said disc member in said elongated opening.

6. A device for straining liquid poured from the opening of a cylindrical vessel having a circular mouth, comprising: a flexible holder member adapted to be flexed into engagement with and to partially encircle the outer cylindrical surface of the vessel, said holder member being adapted to project axially beyond the mouth of the vessel and having resilient attaching means at its ends for detachably connecting said holder member to said vessel; and a disc strainer member carried by and adjustable transversely with respect to said holder member and extending across the mouth of the vessel in axially spaced relation thereto so as to retain solids within said vessel, said strainer member having interstices through which liquid can flow from said vessel.

ROBERT M. BUCKLEY.

REFERENCES CITED

The following references are of record in the file of this patent:

UNITED STATES PATENTS

| Number | Name | Date |
|---|---|---|
| 484,276 | Wright | Oct. 11, 1892 |
| 687,747 | Harding | Dec. 3, 1901 |
| 2,106,453 | Ekdahl | Jan. 25, 1938 |
| 2,133,724 | Smulski | Oct. 18, 1938 |
| 2,357,063 | Swing | Aug. 29, 1944 |
| 2,397,176 | Whiting | Mar. 26, 1946 |